(12) United States Patent
Vetters

(10) Patent No.: US 9,739,202 B2
(45) Date of Patent: Aug. 22, 2017

(54) THERMAL ADJUSTMENT MEMBER FOR A FUEL NOZZLE OF A GAS TURBINE ENGINE

(71) Applicant: Rolls-Royce North American Technologies Inc., Indianapolis, IN (US)

(72) Inventor: Daniel K. Vetters, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 330 days.

(21) Appl. No.: 14/710,308

(22) Filed: May 12, 2015

(65) Prior Publication Data

US 2016/0333787 A1    Nov. 17, 2016

(51) Int. Cl.
*F03B 17/06* (2006.01)
*F02C 7/22* (2006.01)

(52) U.S. Cl.
CPC .... *F02C 7/222* (2013.01); *F05D 2300/50212* (2013.01)

(58) Field of Classification Search
CPC .............. F02C 7/222; F05D 2300/50212
USPC ............................................. 60/740
See application file for complete search history.

(56) References Cited

U.S. PATENT DOCUMENTS

| 3,664,124 A | | 5/1972 | Fehler |
| 4,638,636 A | | 1/1987 | Cohen |
| 4,793,372 A | * | 12/1988 | Gauthier ............ G05D 16/2013 137/468 |
| 4,848,726 A | * | 7/1989 | Hary ....................... F15B 5/003 137/625.64 |
| 5,361,578 A | * | 11/1994 | Donlan ..................... F02C 3/30 60/39.55 |
| 6,758,043 B2 | | 7/2004 | Michau et al. |
| 6,901,953 B2 | | 6/2005 | D'Agostino et al. |
| 7,900,456 B2 | | 3/2011 | Mao |
| 8,047,002 B2 | | 11/2011 | Pieussergues et al. |
| 2010/0108149 A1 | * | 5/2010 | Wheater ............ G05D 16/2013 137/14 |
| 2011/0236183 A1 | * | 9/2011 | Amaral ................. F01D 11/005 415/134 |
| 2012/0180494 A1 | | 7/2012 | Bailey et al. |

* cited by examiner

*Primary Examiner* — Jesse Bogue
(74) *Attorney, Agent, or Firm* — McCracken & Gillen LLC

(57) ABSTRACT

A fuel nozzle for use in a gas turbine engine is provided. The fuel nozzle has a fuel nozzle tip with an outer tip housing. The tip housing has a recess formed at an inner surface of the tip housing. A shim is disposed within the recess and a surface of the shim contacts a diaphragm of the fuel nozzle tip. A thermal adjustment member is disposed within the recess against the shim. The tip housing, diaphragm and shim are formed of a base material having a coefficient of thermal expansion ($\alpha_1$) and the thermal adjustment member is formed of a different material having a coefficient of thermal expansion ($\alpha_2$) higher than the coefficient of thermal expansion ($\alpha_1$) of the base material.

20 Claims, 3 Drawing Sheets

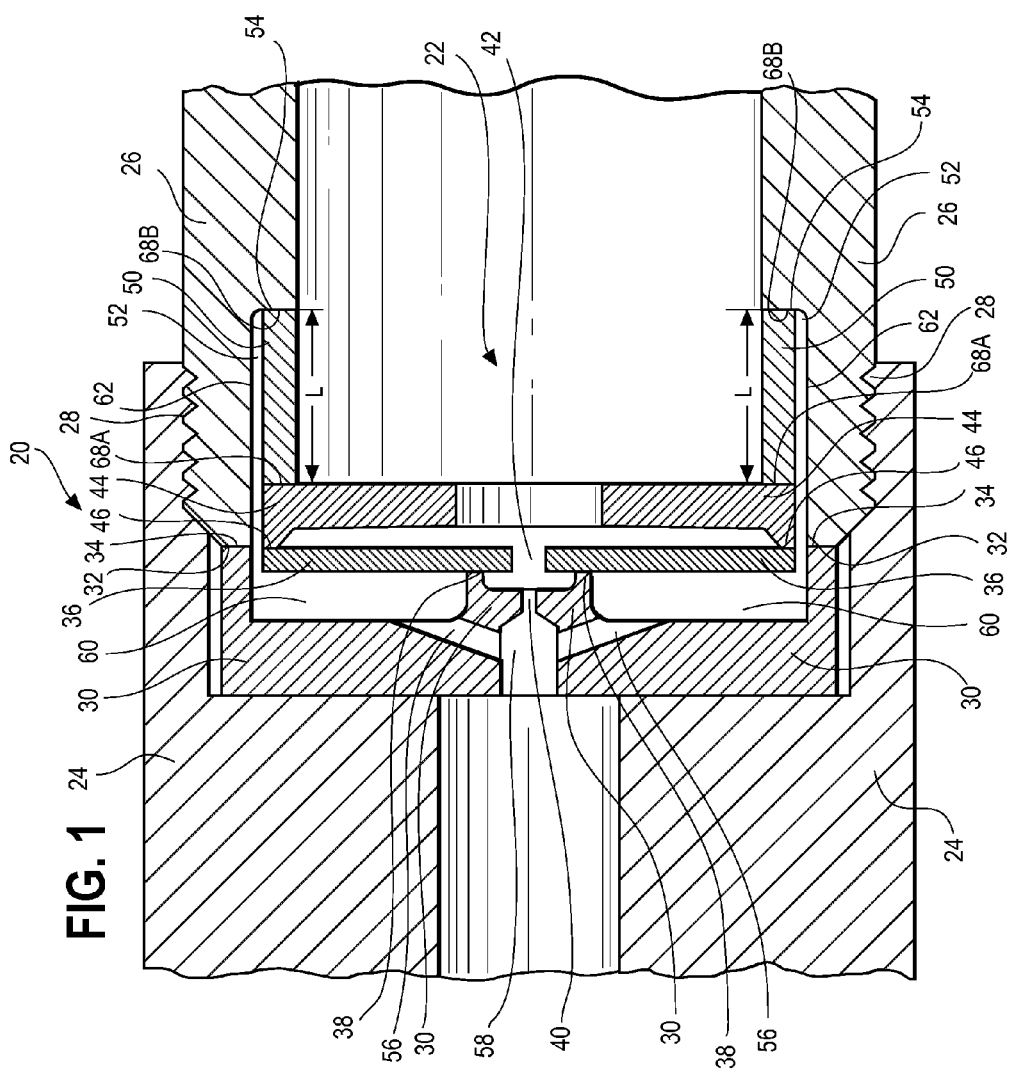
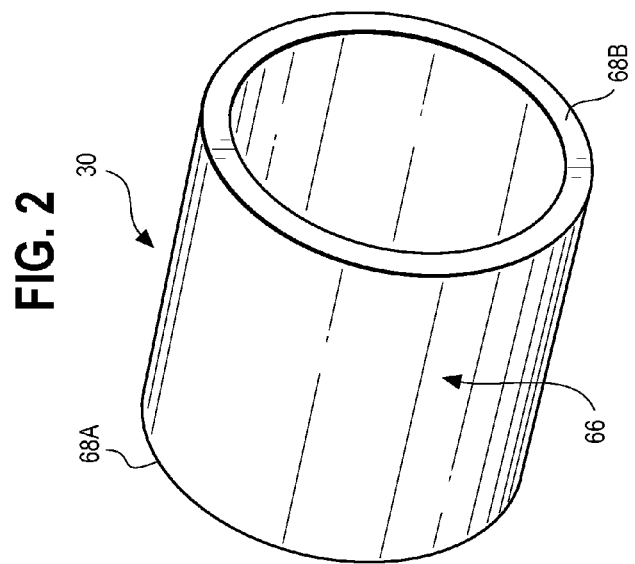

THERMAL ADJUSTMENT MEMBER FOR A FUEL NOZZLE OF A GAS TURBINE ENGINE

REFERENCE REGARDING FEDERALLY SPONSORED RESEARCH OR DEVELOPMENT

This invention was made with government support under NC 1091, contract FA86509-09-D-2921/0010. The government has certain rights in the invention.

CROSS REFERENCE TO RELATED APPLICATIONS

Not applicable

SEQUENTIAL LISTING

Not applicable

FIELD OF THE DISCLOSURE

The present subject matter relates to fuel nozzles, and more particularly, to fuel nozzles for gas turbine engines.

BACKGROUND

Gas turbine engines employ fuel injectors for providing fuel into the combustor of the turbine engine. Fuel injectors generally have an external body with an inlet at one end for receiving fuel and a fuel nozzle for providing the fuel to the combustor. An inner tube may be in fluid communication with the inlet and the fuel nozzle to deliver fuel received at the inlet of the fuel injector to the fuel nozzle. The combustor uses atomized fuel to run the turbine engine.

The fuel nozzle discharges an air-fuel mixture into the combustor causing combustion that creates a hot pressurized exhaust gas. Certain fuel nozzles employ a diaphragm which may be in contact against a seat component of the fuel nozzle. The seat and diaphragm may be contained near the tip of the fuel nozzle such that during fuel flow operation the surrounding metal may be exposed to the hot gases within the gas turbine combustor. As such, high metal temperatures may be experienced in the nozzle body, seat and diaphragm. Additionally, thermal shifts in fueling may occur due to changes in the modulus of elasticity of fuel nozzle components when operating at high metal temperatures.

Shifts in fueling at high operating temperatures and variability in nozzle to nozzle fueling may affect the life of turbine engine components. The fueling shift at increased temperatures may be problematic, especially if the engine might experience two phase flow within the fuel system. Thus, two phase flow may be a concern particularly in engines configured to run high temperature fuel through the fuel nozzle.

SUMMARY

According to one aspect a fuel nozzle for use in a gas turbine engine is provided. The fuel nozzle has a fuel nozzle tip with an outer tip housing. The tip housing has a recess formed at an inner surface of the tip housing. A shim is disposed within the recess and a surface of the shim contacts a diaphragm of the fuel nozzle tip. A thermal adjustment member is disposed within the recess against the shim. The tip housing, diaphragm and shim are formed of a base material having a coefficient of thermal expansion ($\alpha_1$) and the thermal adjustment member is formed of a different material having a coefficient of thermal expansion ($\alpha_2$) higher than the coefficient of thermal expansion ($\alpha_1$) of the base material.

According to another aspect, a fuel nozzle is provided for use in a gas turbine engine. The fuel nozzle has a fuel nozzle tip with an outer tip housing. The tip housing has a recess formed at an inner surface of the tip housing. A shim is disposed within the recess and a surface of the shim contacts a diaphragm of the fuel nozzle tip. A thermal adjustment member of the shim is disposed within the recess and is in contact with the tip housing. The shim and the thermal adjustment member are formed as a single piece component. The tip housing and diaphragm are formed of a base material having a coefficient of thermal expansion ($\alpha_1$) and the shim having the thermal adjustment member is formed of a different material having a coefficient of thermal expansion ($\alpha_2$) higher than the coefficient of thermal expansion ($\alpha_1$) of the base material.

BRIEF DESCRIPTION OF THE DRAWINGS

FIG. 1 is a partial cross-sectional view of a fuel nozzle for a gas turbine engine;

FIG. 2 is an isometric view of an embodiment of a thermal adjustment member;

DETAILED DESCRIPTION

Figure 3:
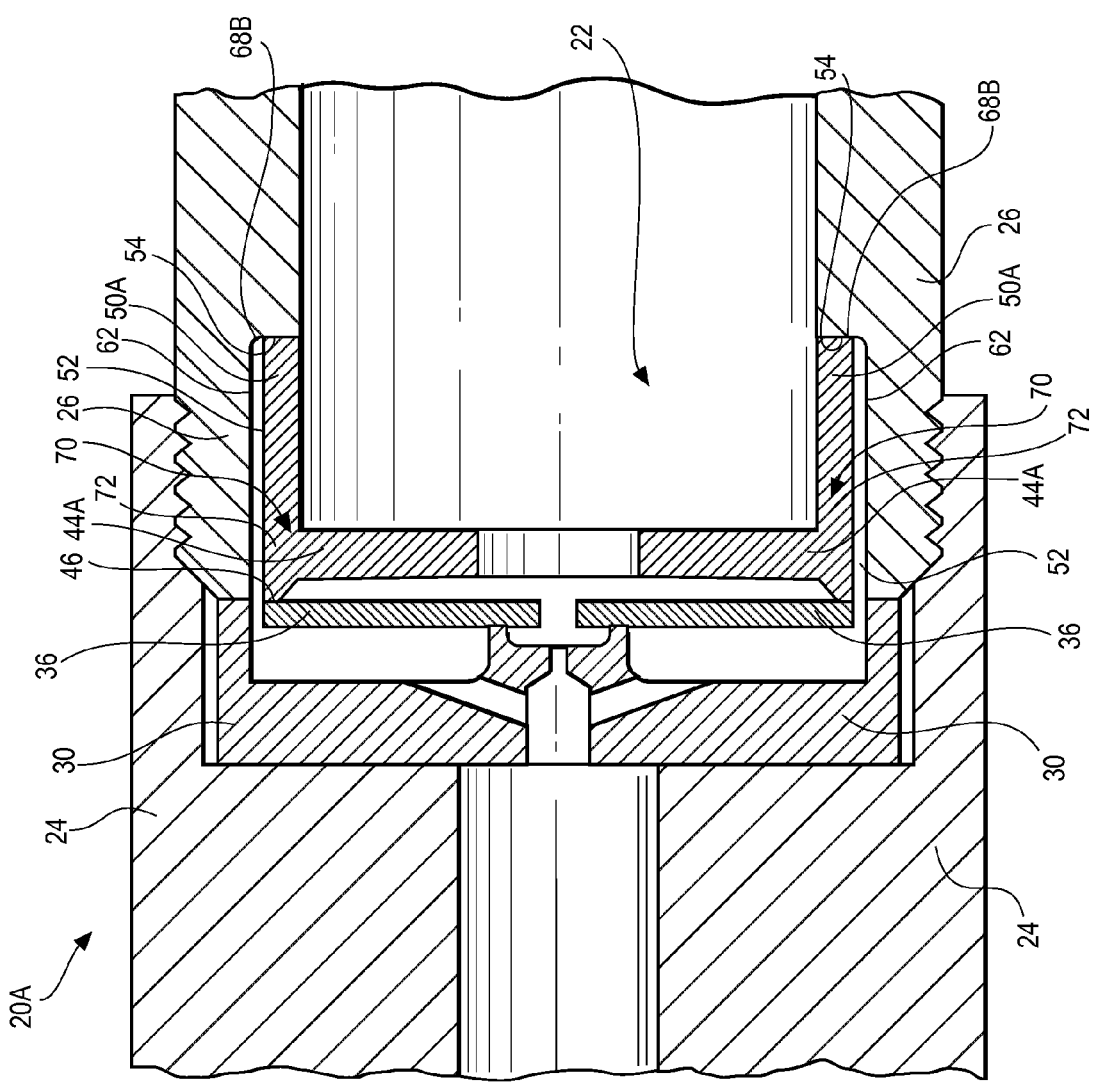
FIG. 3 is a partial cross-sectional view of an alternative embodiment of the fuel nozzle.

Referring to FIG. 1, a fuel nozzle 20 for use in a gas turbine engine is shown with fuel nozzle tip 22 engaged with a body 24 of the fuel nozzle 20. Fuel nozzle tip 22 has an outer tip housing 26 that is secured to the body 24 of the fuel nozzle 20. In this example embodiment, threaded bracket joint 28 is used to attach the tip housing 26 to the fuel nozzle body 24. Seat 30 is disposed against the body 24 and has an end face 32 that is fitted to contact an end 34 of the outer fuel nozzle tip housing 26.

A diaphragm 36 is disposed within the fuel nozzle tip 22 and engages the seat 30 at contact points 38 proximate a pilot orifice 40. Main orifice 42 is positioned at an opening of the diaphragm 36 and fuel flow is provided between the pilot orifice 40 and main orifice 42 of the fuel nozzle tip 22. A shim 44 is positioned adjacent the diaphragm 36 in which a surface 46 of the shim 44 abuts the diaphragm 36 proximate an end opposite the contact points 38 where the seat 30 engages the diaphragm 36. Thermal adjustment member 50 is disposed within a recess 52 and positioned between shim 44 and a wall 54 of the tip housing 26. In this example, fuel channels 56 may extend from fuel conduit 58 through the seat 30 to an internal cavity 60 formed between the seat 30 and diaphragm 36 and extending into recess 52 formed in the tip housing 26.

In this example embodiment, the diaphragm 36 of the fuel nozzle 20 is preloaded against the seat 30 by supporting the outer diameter of the diaphragm 36 with a given displacement. In this arrangement as seen in FIG. 1, the seat 30 is closed until a threshold fuel pressure is applied and the diaphragm 36 is deflected off the seat 30 opening an area at the pilot orifice 40 through which fuel can flow. As seen in FIG. 1, the fuel nozzle 20, in this example, has the seat 30 and the diaphragm 36 contained in the fuel nozzle tip 22 such that the surrounding metal of the tip housing 26 and nozzle body 24 is exposed to hot gases within the gas turbine combustor. As such, high metal temperatures which may range from approximately 500° Fahrenheit (F) to 1400° F. are experienced in the nozzle body 24, tip housing 26, seat 30 and diaphragm 36. A wide temperature range may be experienced, for instance, because the fuel nozzle 20 can be cooled by fuel (hence the approximate 500° F. level) or the fuel nozzle 20 may be heavily exposed to high air temperatures up to approximately the 1400° F. level.

As seen in FIG. 1, the fuel nozzle 20 has a recess 52 formed at an inner surface 62 of the outer tip housing 26. The shim 44 is disposed within the recess 52 and surface 46 of the shim 44 contacts the diaphragm 36. The thermal adjustment member 50 is also disposed within the recess 52 and is in contact against the shim 44. In this embodiment, the thermal adjustment member 50 has a length (L) that extends from the shim 44 to a wall 54 of the inner surface 62 of the tip housing 26. As further seen in FIG. 1, the seat 30 makes contact with the diaphragm 36 proximate the pilot orifice 40 of the fuel nozzle tip 22. The seat 30, in this example, also makes contact with an end 34 of the tip housing 26, such that the diaphragm 36, shim 44 and thermal adjustment member 50 are enclosed within the interior of the fuel nozzle tip 22.

Components of the fuel nozzle tip 22 are generally formed of a base material having a coefficient of thermal expansion ($\alpha_1$) and the thermal adjustment member 50 is formed of a different material having a coefficient of thermal expansion ($\alpha_2$) higher than the coefficient of thermal expansion ($\alpha_1$) of the base material. In one embodiment, for example, the tip housing 26, diaphragm 36, and shim 44 may be formed of a metallic material having a coefficient of thermal expansion that is lower than the coefficient of thermal expansion for the material of the thermal adjustment member 50. For instance, the thermal adjustment member 50 may be a metal component formed from cobalt, cobalt alloys or stainless steel. The base material for the fuel nozzle tip components such as the tip housing, shim, and diaphragm may be formed from nickel or nickel alloy materials, or lower alpha ($\alpha$) stainless steel material. The material and length (L) of the thermal adjustment member 50 are preselected to provide for thermal growth such that the thermal adjustment member 50 offsets loss in diaphragm preload due to a lower modulus of elasticity at temperature. By selecting an appropriate length (L) and material for the thermal adjustment member 50, the thermal adjustment member is tuned to counter fueling shifts due to changes in the modulus of elasticity of the diaphragm 36 when the fuel nozzle tip 22 is operating at high metal temperatures.

In one example embodiment, the length (L) of the thermal adjustment member 50 may be sized for a fuel nozzle having a simply supported diaphragm 36 loaded at the inner diameter and outer diameter, such as seen in FIG. 1. In this example, applying Roark's Formula's for Stress and Strain, Table 24, New York, McGraw-Hill, (2002) the relationship between diaphragm deflection, $y_b$ and annular line load, w is:

$$y_b = \frac{-wd^3}{D}\left(\frac{C_1 L_9}{C_7} - L_3\right) \quad (1)$$

In the above equation (1), d=outer radius of diaphragm; $c_1, L_9, C_7, L_3$=f (geometry and v [Poisson's Ratio]; D=plate constant; and wherein;

$$D = \frac{Et^3}{12}(1-v^2) \quad (2)$$

Poisson's ratio and geometry may be viewed as being constant. As such, the load at the seat 30 is directly proportional to a change in elastic modulus. Additionally, if the load is held constant, in this example, $y_6$ is inversely proportional to E.

$$y_2 = y_1 \frac{E_1}{E_2} \quad (3)$$

The required change in deflection to maintain a constant load is:

$$\Delta y = y_1 \left(\frac{E_1}{E_2} - 1\right) \quad (4)$$

If the thermal adjustment member 50 has a coefficient of thermal expansion of $\alpha_2$ (vs. a base material coefficient of $\alpha_1$) and has a length of (L) then:

$$\Delta L = \Delta T \times L_1 \times \alpha_2 \quad (5)$$

$$\Delta \text{Length}_{nozzle} = \Delta T \times L_1 \times \alpha_1 \quad (6)$$

$$\Delta L_{relative} = \Delta T \times L_1 (\alpha_2 - \alpha_1) \quad (7)$$

The relative growth of the thermal adjustment member 50 must equal the required change in deflection of the diaphragm 36 to maintain a constant load at the seat 30.

$$\Delta y = \Delta L_{relative} \quad (8)$$

$$y_1\left(\frac{E_1}{E_2} - 1\right) = \Delta T \times L_1(\alpha_2 - \alpha_1) \quad (9)$$

Solving this for $L_1$, gives:

$$L_1 = \frac{y_1}{\Delta T} \times \frac{\left(\frac{E_1}{E_2} - 1\right)}{(\alpha_2 - \alpha_1)} \quad (10)$$

In the above equations (8)-(10), $L_1$=length of the thermal adjustment member at cold build; $y_1$=diaphragm deflection at cold build; $\Delta T$=temperature during operation minus metal temperature at cold build; $E_1$=diaphragm modulus at cold build; and $E_2$=diaphragm modulus at operating temperature.

As seen, the thermal adjustment member 50 positioned in the fuel nozzle tip 22 counters fueling shifts due to changes in the modulus of elasticity of the diaphragm 36 and seat 30 when at high operating temperatures. By adding the thermal adjustment member 50 in this arrangement and optimizing the material selection for a higher coefficient of thermal expansion as well as selecting the appropriate length for the thermal adjustment member 50, additional thermal growth of the thermal adjustment member 50 can offset the loss in diaphragm 36 preload due to lower modulus of elasticity. Fueling shifts between cold build and high operating temperatures may then be reduced. Variability in nozzle to nozzle and engine to engine fueling may be reduced since fueling can be desensitized to metal temperatures. Pressures within the fuel nozzle may also be kept at high pressure levels since the fueling curve may not shift to higher fueling at lower pressures with increased metal temperatures, thereby avoiding two phase flow within the fuel system. Reduction in fueling variability may provide for increased longevity of downstream fuel nozzle components as well (combustor liners, nozzle guide, vanes, turbine blades, etc.)

As seen in FIG. 2, the thermal adjustment member 50 in this example embodiment is shaped as a metallic cylindrical ring 66. In the fuel nozzle tip 22, the cylindrical ring 66 is disposed in the recess 52 between the shim 44, FIG. 1, and the wall 54 of the tip housing 26 such that one face 68A of the cylindrical ring 66 contacts the shim 44 and an opposing face 68B of the cylindrical ring 66 contacts the vertical wall 54 formed at the inner surface 62 of the fuel nozzle tip housing 26. As provided herein, the cylindrical ring 66 of the thermal adjustment member 50 may be formed of a metal material (such as cobalt, cobalt alloys, or stainless steel) having a coefficient of thermal expansion ($\alpha_2$) that is higher than a coefficient of thermal expansion ($\alpha_1$) corresponding to the base material of the fuel nozzle tip.

Referring to FIG. 3, an alternative embodiment of a fuel nozzle 20A is shown. In this example, the shim 44A and the thermal adjustment member 50A are formed as a single piece component 70. Thus, the single piece component 70 of the shim 44A having the thermal adjustment member 50A is formed from a metallic material having a coefficient of thermal expansion ($\alpha_2$) that is higher than the coefficient of thermal expansion ($\alpha_1$) of the base material components of the fuel nozzle tip 22 including the tip housing 26 and diaphragm 36. The single piece shim having the thermal adjustment component, for example, may be formed from cobalt, cobalt alloys or stainless steel with the base material being formed from nickel or nickel alloy materials. The single piece shim 44A, in this embodiment, is formed of a material selected to optimize the coefficient of thermal expansion and the shim 44A has the added length of the thermal adjustment member 50A selected to minimize fueling thermal shift. In this embodiment, the thermal adjustment member 50A of the single piece shim 44A is in the shape of a cylindrical ring that extends substantially perpendicular to the body member 72 of the shim 44A. The shim 44A is disposed within the recess 52 formed in the inner surface 62 of the fuel nozzle tip housing 22. A surface 46 of the shim 44A is in contact with the diaphragm 36 and the thermal adjustment member 50A has a length (L) that extends laterally within the recess 52 from the body member 72 of the shim 44A such that face 68B of the thermal adjustment member 50A contacts the vertical wall 54 formed in the inner surface 62 of the tip housing 26. The length of the thermal adjustment member 50A and the material of the single piece shim component 70 having the laterally extending thermal adjustment member 50A are preselected to counter fueling shifts due to changes in the modulus of elasticity of the diaphragm 36 when the fuel nozzle tip 22 is operating at high operational temperatures.

Figure 4:
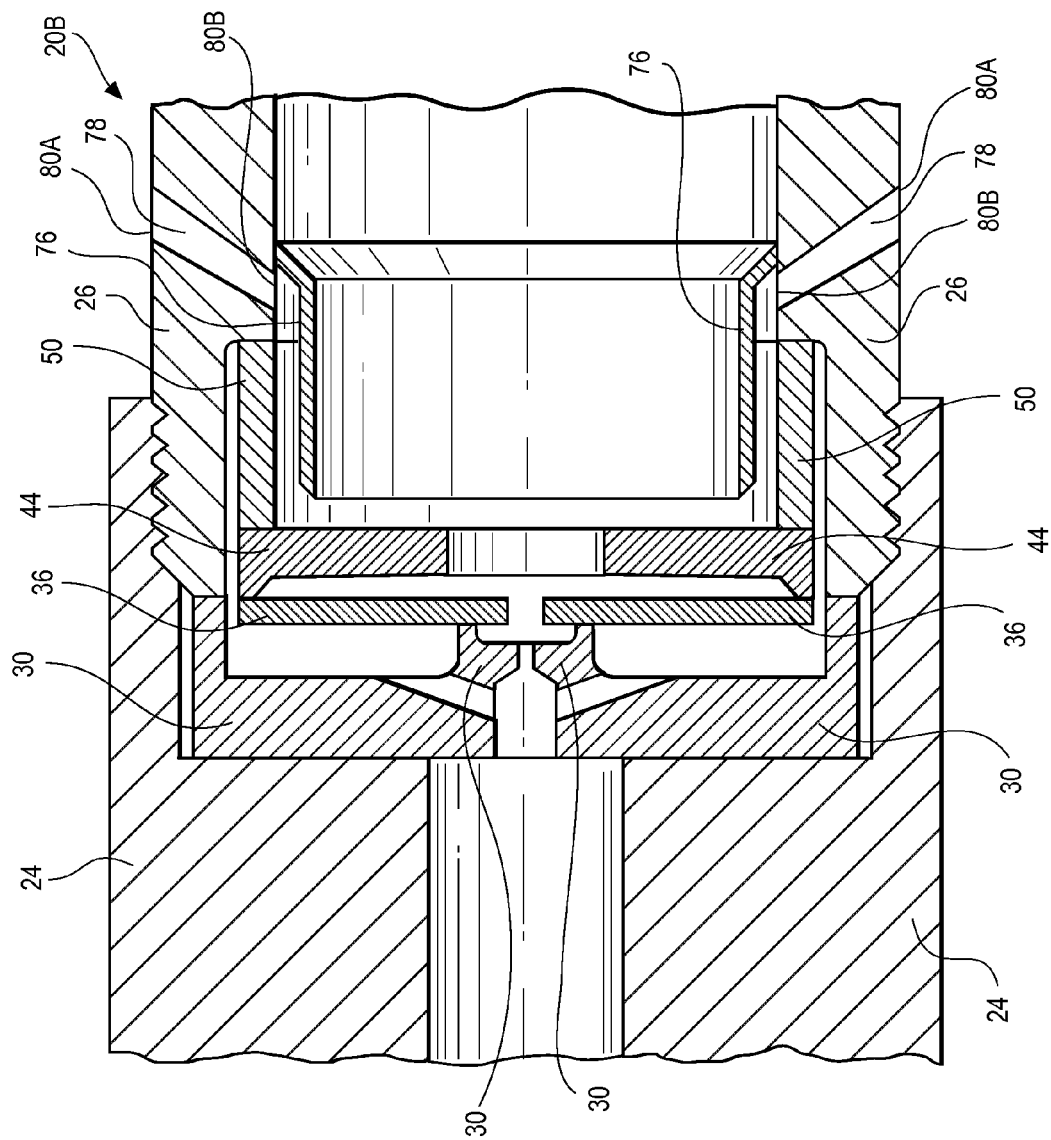
FIG. 4 is a partial cross-sectional view of a further alternative embodiment of the fuel nozzle.

Thermal management of the thermal adjustment member 50 may be provided through various forms such as heat shields, tuning of thermal mass, or providing air channels to conduct surrounding air at or along the thermal adjustment member 50 to improve heat transfer. Referring to FIG. 4, an alternative example embodiment of the fuel nozzle 20B of FIG. 1 is shown having a heat shield 76 to provide thermal management of the thermal adjustment member 50. In this example, the heat shield 76 is secured to the tip housing 26 and is spaced apart from the thermal adjustment member 50. The heat shield 76, in this example, is aligned substantially parallel along at least a portion of the length of the thermal adjustment member 50. Additionally, thermal management of the thermal adjustment member 50 may be accomplished by controlling air flow along the thermal adjustment member 50. As seen in the example in FIG. 4, air channels 78 extending through the tip housing 26 may alternatively be provided. In this example, one end 80A of the channel 78 is at an exterior of the tip housing 26 and another end 80B is at an interior of the tip housing 26 proximate the thermal adjustment member 50 such that the channel 78 enables air to flow along the thermal adjustment member 50 to provide heat transfer management. By thermally managing the temperature of the thermal adjustment member 50 the performance of the thermal adjustment member 50 can be tuned with respect to transient conditions. For instance, increased heat transfer or lower thermal mass may be beneficial if it is desirable for the thermal adjustment member 50 to act relatively faster. Alternatively, it may be beneficial to provide shielding, insulation or additional thermal mass if it is desirable to have relatively slower action of the thermal adjustment member 50.

INDUSTRIAL APPLICABILITY

As provided herein, the thermal adjustment member may be employed in various nozzle designs for turbine engine applications, including limited life or small, low cost gas turbine applications. The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. A fuel nozzle for use in a gas turbine engine, comprising:
   a fuel nozzle tip having an outer tip housing, wherein the outer tip housing has a recess formed at an inner surface of the outer tip housing;
   a shim disposed within the recess, wherein a surface of the shim contacts a diaphragm of the fuel nozzle tip; and
   a thermal adjustment member disposed within the recess against the shim, wherein the outer tip housing, diaphragm and shim are formed of a base material having a linear coefficient of thermal expansion ($\alpha_1$) and the thermal adjustment member is formed of a different material having a linear coefficient of thermal expansion ($\alpha_2$) higher than the linear coefficient of thermal expansion ($\alpha_1$) of the base material.

2. The fuel nozzle of claim 1 wherein the thermal adjustment member has a length that extends from the shim to a wall of the inner surface of the outer tip housing.

3. The fuel nozzle of claim 2 wherein the thermal adjustment member is a cylindrical ring.

4. The fuel nozzle of claim 3 wherein the cylindrical ring is disposed between the shim and the wall of the outer tip housing such that a face of the cylindrical ring contacts the shim and an opposing face of the cylindrical ring contacts the wall of the inner surface of the outer tip housing.

5. The fuel nozzle of claim 2 wherein the thermal adjustment member is a metal component formed from at least one of: cobalt, cobalt alloys and stainless steel.

6. The fuel nozzle of claim 5 wherein the base material is formed from at least one of: nickel and nickel alloys.

7. The fuel nozzle of claim 1 further comprising a seat wherein the seat contacts the diaphragm proximate a pilot orifice of the fuel nozzle tip.

8. The fuel nozzle of claim 7 wherein the seat further contacts an end of the outer tip housing such that the diaphragm, shim and thermal adjustment member are enclosed within an interior of the fuel nozzle tip.

9. The fuel nozzle of claim 1 wherein the thermal adjustment member is tuned to counter fueling shifts due to changes in a modulus of elasticity of the diaphragm when the fuel nozzle tip is operating at high metal temperatures ranging from approximately 500° F. to approximately 1400° F.

10. The fuel nozzle of claim 9 wherein the material and length of the thermal adjustment member are preselected to provide for thermal growth such that the thermal adjustment member offsets loss in diaphragm preload due to a lower modulus of elasticity.

11. The fuel nozzle of claim 1 further comprising a heat shield wherein the heat shield is in substantially parallel alignment with at least a portion of the length of the thermal adjustment member.

12. The fuel nozzle of claim 11 wherein the heat shield is secured to the outer tip housing and is spaced apart from the thermal adjustment member to provide thermal management of the thermal adjustment member.

13. The fuel nozzle of claim 1 further comprising at least one channel extending through the outer tip housing, wherein one end of the channel is at an exterior of the outer tip housing and another end of the channel is at an interior of the outer tip housing proximate the thermal adjustment member such that the channel enables air to flow along the thermal adjustment member to provide heat transfer.

14. A fuel nozzle for use in a gas turbine engine comprising:
a fuel nozzle tip having an outer tip housing, wherein the outer tip housing has a recess formed at an inner surface of the outer tip housing;
a shim disposed within the recess wherein a surface of the shim contacts a diaphragm of the fuel nozzle tip; and
a thermal adjustment member of the shim disposed within the recess and in contact with the outer tip housing, wherein the shim and the thermal adjustment member comprise a single piece component, and wherein the outer tip housing and diaphragm are formed of a base material having a linear coefficient of thermal expansion ($\alpha_1$) and the shim having the thermal adjustment member is formed of a different material having a linear coefficient of thermal expansion ($\alpha_2$) higher than the linear coefficient of thermal expansion ($\alpha_1$) of the base material.

15. The fuel nozzle of claim 14 wherein the thermal adjustment member has a length that laterally extends within the recess such that a face of the thermal adjustment member contacts a wall of the inner surface of the outer tip housing.

16. The fuel nozzle of claim 15 wherein the thermal adjustment member of the shim is in the shape of a cylindrical ring that extends substantially perpendicular to a body member of the shim.

17. The fuel nozzle of claim 14 wherein the shim having the thermal adjustment member is formed from at least one of: cobalt, cobalt alloys, and stainless steel.

18. The fuel nozzle of claim 17 wherein the base material is formed of at least one of: nickel and nickel alloys.

19. The fuel nozzle of claim 14 further comprising a seat, wherein the seat contacts the diaphragm proximate a pilot orifice of the fuel nozzle tip and wherein the seat further contacts an end of the outer tip housing such that the diaphragm and the shim are enclosed within an interior of the fuel nozzle tip.

20. The fuel nozzle of claim 14 wherein the length of the thermal adjustment member and the material of the shim are preselected to counter fueling shifts due to changes in a modulus of elasticity of the diaphragm when the fuel nozzle tip is operating at high metal temperatures ranging from approximately 500° F. to 1400° F.

* * * * *